O. E. ZAHN.
SPRING PERCH.
APPLICATION FILED APR. 22, 1919.
1,338,895.
Patented May 4, 1920.
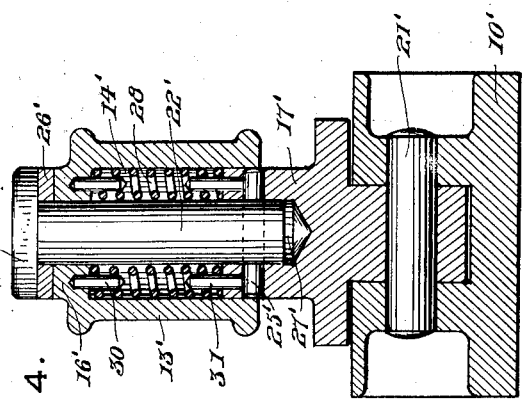
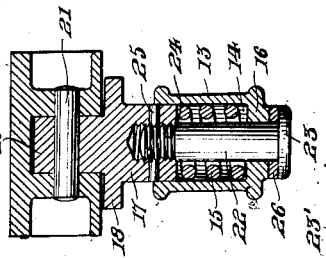
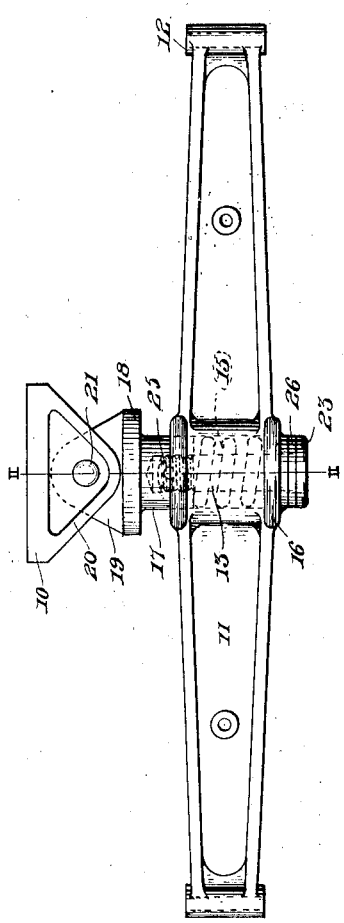
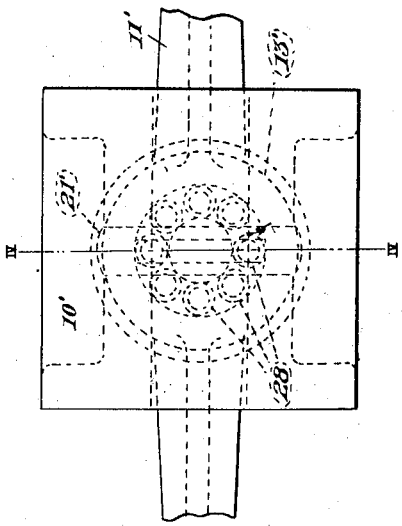
Inventor.
O. E. Zahn
By Bryant
Attorney.

UNITED STATES PATENT OFFICE.

OTTO E. ZAHN, OF SCHLEISINGERVILLE, WISCONSIN, ASSIGNOR TO STANDARD MACHINERY COMPANY, OF SCHLEISINGERVILLE, WISCONSIN, A CORPORATION OF WISCONSIN.

SPRING-PERCH.

1,338,895.

Specification of Letters Patent.

Patented May 4, 1920.

Application filed April 22, 1919. Serial No. 291,805.

*To all whom it may concern:*

Be it known that I, OTTO E. ZAHN, a citizen of the United States of America, residing at Schleisingerville, in the county of Washington and State of Wisconsin, have invented certain new and useful Improvements in Spring-Perches, of which the following is a specification.

The primary object of the invention is the provision of a front axle spring arrangement after the nature of a perch whereby a vehicle frame, or body, may be resiliently mounted upon a vehicle axle, permitting slight turning as well as lateral movements under varying road conditions.

A further object of the invention is to provide a spring perch for the front axle of a vehicle having a desirable degree of vertical flexibility or cushioning properties and permitting slight lateral rocking of the load when the vehicle is in use, the invention being simple in construction and possessing great strength and durability.

A still further object of the invention is to provide a spring perch readily assembled centrally of a vehicle axle with the parts thereof locked in position against accidental displacement when arranged for use.

With these general objects in view and others that will become apparent as the nature of the invention is better understood, the same consists in the novel arrangement, construction, and combination of parts hereinafter more fully described, illustrated in the accompanying drawings, and hereinafter claimed.

In the drawings forming a part of this application and in which like reference characters designate corresponding parts throughout the several views, Figure 1 is a front elevational view of an axle provided with my invention, Fig. 2 is a vertical transverse sectional view taken upon line II—II of Fig. 1, Fig. 3 is a top plan view of a modified form of construction and Fig. 4 is an inverted vertical sectional view taken upon line IV—IV of Fig. 3.

Referring more in detail to the drawing, my invention contemplates the resilient mounting of a supporting block or plate 10 substantially centrally of a front axle 11, of a vehicle, the axle herein illustrated being of substantially the usual form having terminal sleeves 12 for mounting the steering wheels thereon. A central enlargement 13 of the axle 11 provides a cup-shaped socket 14 adapted for receiving a helical spring 15 seated upon the bottom 16 thereof while a cylindrical plunger 17 seats upon the spring 15 slidable within the socket 14. The head 18 of the plunger 17 has a substantially triangular upstanding rib 19 to which the base plate 10 is pivoted. This pivoting means comprises spaced depending reinforced brackets 20 substantially triangular in form with the rib 19 positioned therebetween and a pivot pin 21 secured through the rib 19 and ears 20 and from which construction it will be evident that the base plate 10 is capable of lateral rocking movements upon the plunger 17 in the direction of length of the axle 11 and consequently transversely of the vehicle body.

A bolt 22, which may sometimes serve as a king-bolt when desired, extends axially through the enlargement 13 with its head 23 beneath the bottom 16, and its threaded inner end 24 engaging within the threaded recess 27 centrally of the lower end of the plunger 17. After the bolt 22 is placed in its assembled position, the plunger 17 is elevated sufficiently above the enlargement 13 to permit the entrance of a pin or cotter 25 transversely through the plunger 17 and the end portion 24 of the bolt, thereby locking the bolt against turning. The dropping of the plunger 17 upon the spring 15 brings the pin 25 within the socket 14 preventing the accidental removal of said pin 25, while a spacing washer 26 of any desired form may be then mounted upon the bolt 22 between the enlargement end 16 and the head 23 of the bolt.

The base plate 10 is cushioned by means of the spring-mounted plunger 17 for maintaining the load against sudden shocks and jars imparted to the axle 11 during traffic conditions while the pivot pins 21 prevents the vertical swaying movement of the axle 11 from effecting the level condition of the base-plate 10 and the load mounted thereon. A different form of the cushioning means might be preferable under certain conditions and a plurality of helical springs 28 take the place of the spring 15 heretofore referred to. The remaining elements are identical, employing a base-plate 10' having a plunger 17' pivotally connected thereto by a pin 21' while the plunger is shiftable within a socket 14' of the enlargement 13' of the axle 11'. A bolt 22' within the enlargement 13' has a head 23' outwardly thereof while the inner end of the bolt extends within a recess 27' in the plunger 17'. A pin 25' extends through the plunger 17' and bolt 22' for locking the members together being normally within the socket 14'. Dowels or posts 30 extend into the socket 14' from the bottom 16' of the enlargement 13' for mounting the springs 28 thereon while similar dowels or posts 31 upon the inner end of the plungers 17' are in axial alinement with the dowels 30 for reception within the upper ends of the springs 28. When the elements are assembled, a washer 26' which may be a split washer or of any other convenient form similar to the aforementioned washer 26 is mounted upon the bolt 22' between the head 23' and the bottom 16' of the enlargement 13'.

A strong mounting or perch is provided in this manner upon the front axle 11 with the resilient means protected within the socket of the axle while the invention is capable of performing all of the functions required of a device of this nature and carries out the same in an advantageous manner.

What I claim is:—

1. In combination with an axle having an enlargement provided with a cup-shaped socket having a bottom, concentrically arranged upright posts mounted upon said bottom within the socket, a plunger slidably mounted in the outer end of the socket, dowels carried by the inner end of the plunger in axial alinement with said posts, helical springs within the socket mounted upon said dowels and posts with the plunger seated upon said springs and a plate pivoted to the outer end of the plunger.

2. In combination with an axle having an enlargement provided with a cup-shaped socket having a bottom, concentrically arranged upright posts mounted upon said bottom within the socket, a plunger slidably mounted in the outer end of the socket, dowels carried by the inner end of the plunger, in axial alinement with said posts, helical springs within the socket mounted upon said dowels, a rib upon the outer end of the plunger, a supporting plate pivoted to the rib having lateral movement in the direction of length of the axle and a retaining bolt locked to the plunger when the device is assembled having a head positioned beneath the bottom of said enlargement.

3. In combination with an axle having an enlargement provided with a cup-shaped socket having a bottom, concentrically arranged upright posts mounted upon said bottom within the socket, a plunger slidably mounted in the outer end of the socket, dowels carried by the inner end of the plunger, in axial alinement with said posts, helical springs within the socket mounted upon said dowels, a rib upon the outer end of the plunger, a supporting plate pivoted to the rib having lateral movement in the direction of length of the axle, a bolt axially positioned through said enlargement extending centrally into the inner end of the plunger, with the head of the bolt outwardly of the closed end of the socket, a locking pin positioned transversely through said plunger and bolt restrainingly positioned within the socket when the device is assembled and a spacing washer between the head of the bolt and the bottom of the enlargement whereby said pin is prevented from withdrawal from the socket.

In testimony whereof I affix my signature.

OTTO E. ZAHN.